Figure 1:
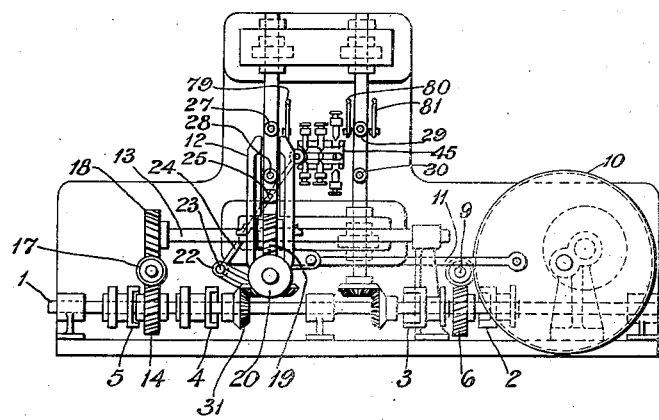

Feb. 6, 1940.  D. G. ASHCROFT  2,189,557
METHOD OF AND APPARATUS FOR THE PRODUCTION OF COILED HANKS OF WIRE
Filed March 9, 1938  5 Sheets-Sheet 1

Donald George Ashcroft  INVENTOR.
BY Thos. A. Wilson
ATTORNEY.

Feb. 6, 1940.      D. G. ASHCROFT      2,189,557
METHOD OF AND APPARATUS FOR THE PRODUCTION OF COILED HANKS OF WIRE
Filed March 9, 1938      5 Sheets-Sheet 2

Donald George Ashcroft INVENTOR.
BY Thos. A. Wilson
ATTORNEY

Feb. 6, 1940.   D. G. ASHCROFT   2,189,557
METHOD OF AND APPARATUS FOR THE PRODUCTION OF COILED HANKS OF WIRE
Filed March 9, 1938   5 Sheets-Sheet 3
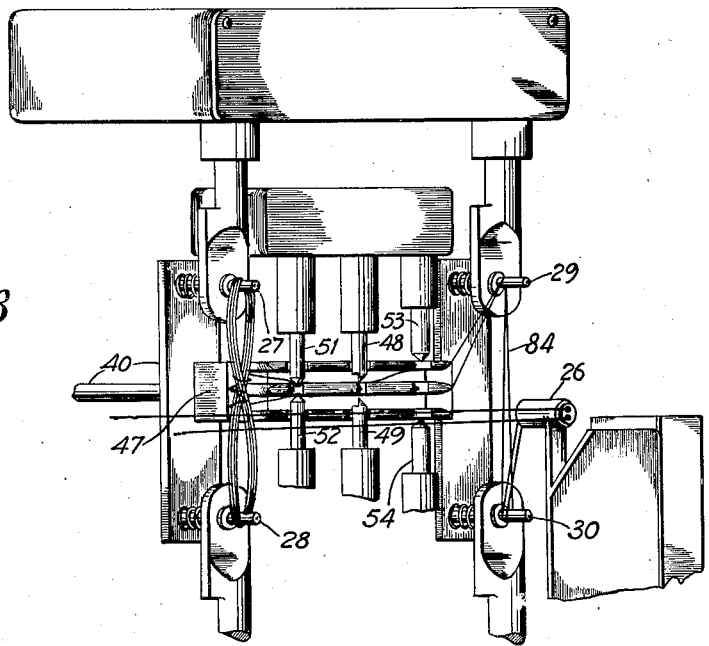
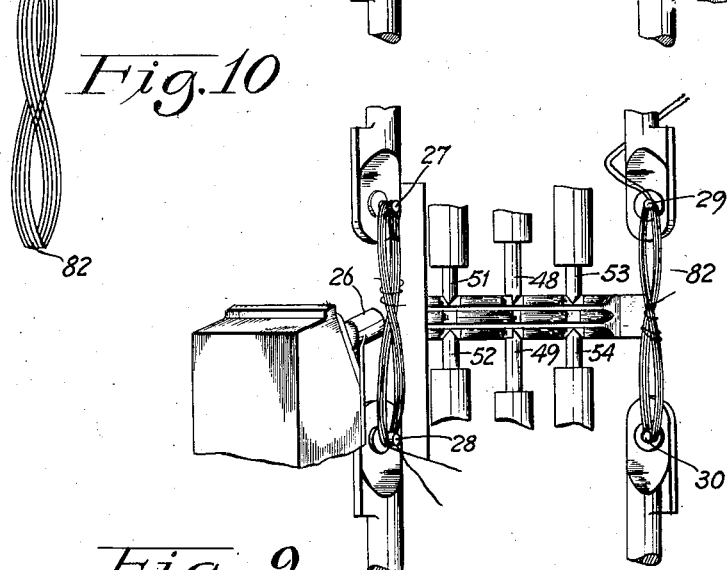
Donald George Ashcroft INVENTOR
BY
ATTORNEY Showing completed Right Hand Coil Rotation of Coil on Winding Pins Showing commenced Left Hand Coil.

Completed L.H.Coil

Donald George Ashcroft
INVENTOR.

BY Thos A. Wilson
ATTORNEYS.

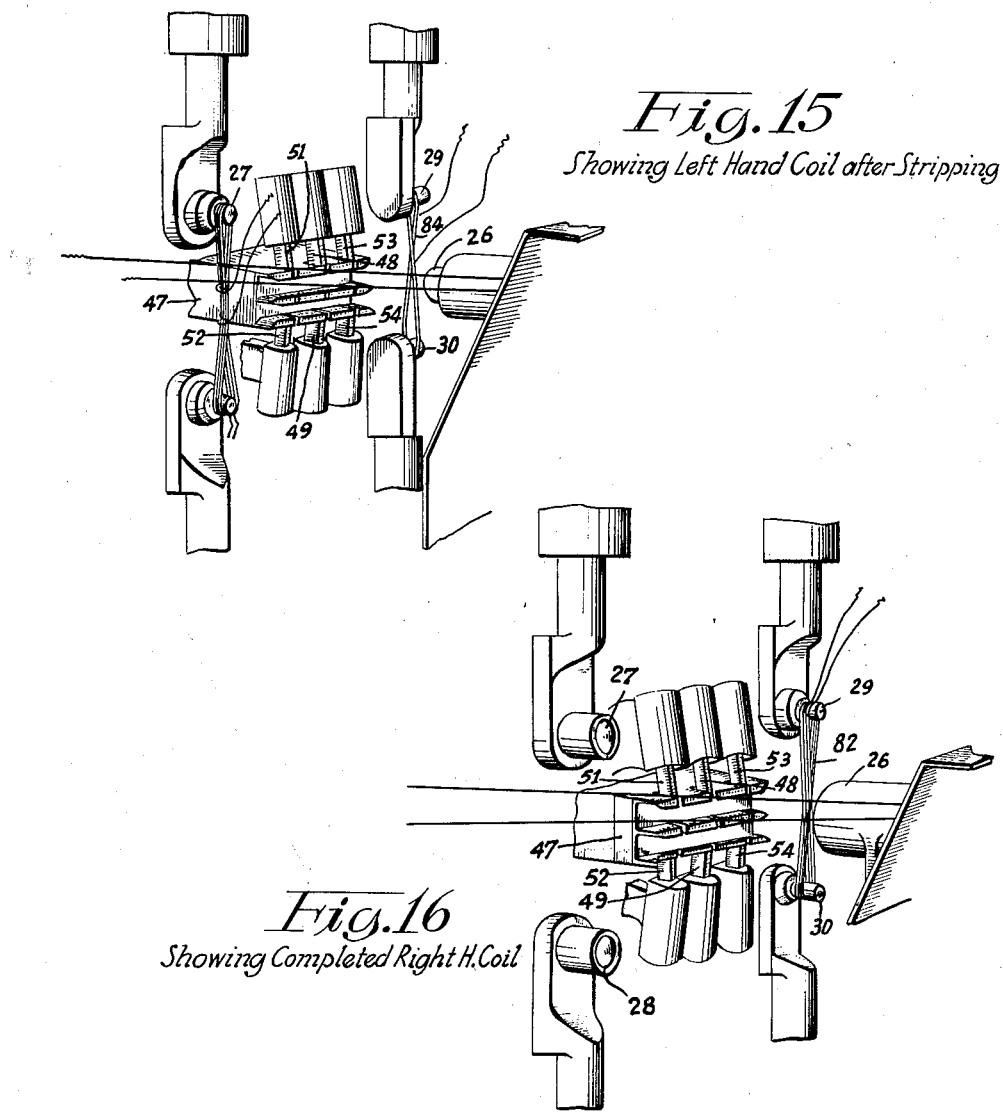

Patented Feb. 6, 1940

2,189,557

UNITED STATES PATENT OFFICE 2,189,557

METHOD OF AND APPARATUS FOR THE PRODUCTION OF COILED HANKS OF WIRE

Donald George Ashcroft, Saltcoats, Scotland, assignor to Imperial Chemical Industries Limited, a corporation of Great Britain Application March 9, 1938, Serial No. 194,978
In Great Britain March 12, 1937

11 Claims. (Cl. 140—71)

The present invention relates to a method of and apparatus for the production of coiled and wrapped hanks of wire. The invention relates in particular to the production of coiled and wrapped hanks of wire suitable for use in the manufacture of electric blasting detonators.

It is frequently desired in commerce to coil comparatively short lengths of wire into hanks, for example, electric blasting detonators are usually provided with insulated double wire leads of various lengths. For convenience of packing it is desirable that such leads should be coiled and wrapped.

This invention has as an object to devise a method of coiling and wrapping such hanks automatically. A further object is to devise a method which will continuously produce hanks of substantially identical size. A still further object is to devise apparatus suitable for carrying out such methods. Further objects will appear hereinafter. These objects are accomplished by the following invention.

I have found that I can achieve these objects if I first utilise the relative movement of a shuttle or like device and a pair of winding pins to form a coil and then rotate the coil round its longitudinal axis so that it is wrapped under tension, and then cause the shuttle to move to a second pair of winding pins where it is again caused to move relatively to these winding pins to form a second coil, and when sufficient length is coiled round the second pins to prevent the coil from slipping during the coiling operation, cutting the wire between the first pair of winding pins and the second and removing the wrapped coil from the first pair of pins. I now use the winding of the second coil as the commencement of a new cycle of operations in which the two pairs of winding pins exchange the functions which they perform in the first cycle.

The winding position is suitably formed by two horizontal and parallel pins separated by a vertical distance corresponding to the desired length of the hanks of wire to be produced, and each fixed to an independent rotatable vertical shaft so that the hank coiled on the pins may be spun round a vertical axis and thereby wrapped round the middle by the wire emerging under tension from the shuttle.

The winding shuttle may consist essentially of a nozzle or nozzles through which the wire is led from the supply to the winding pins. Where a double wire lead is being wound, the wires may be led separately through the two passages of a double nozzle; but a single nozzle will usually work satisfactorily with double wire leads.

According to the preferred form of the invention, the hank is coiled by the movement of the shuttle around a pair of stationary winding pins, which thereafter are caused to rotate around the longitudinal axis of the hank so that the latter is wrapped. However, other methods of producing the same result may be employed; for instance, the hanks may be produced by the rotation of the framework carrying the winding pins so that the wire is coiled on to them from a stationary shuttle; whereupon the substitution of a rotation around the longitudinal axis of the hank so produced for the initial rotation will produce a wrapping action.

The shuttle may be caused to carry the wire round the pins in a simple overhand motion; or if desired it may be caused to wind figure-of-eight hanks. Alternatively, I may produce a slight relative movement parallel to the axis of the pins during the coiling operation, by movement of the shuttle and/or the pins, so that the wire is laid on the pins in spiral fashion. Either of the above methods of coiling the hanks has the advantage that a straight pull on the free ends of the hank extends the wires fully without producing any kinks.

Figure 2:
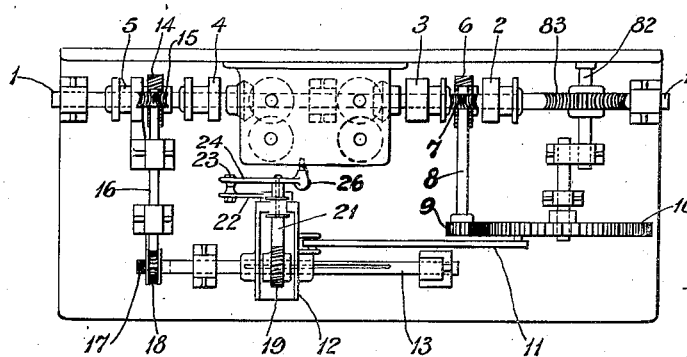
Figure 3:
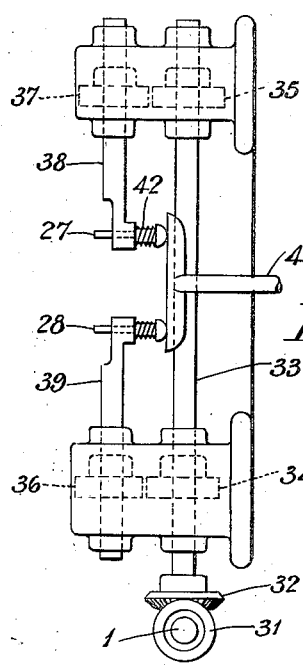
Figure 4:
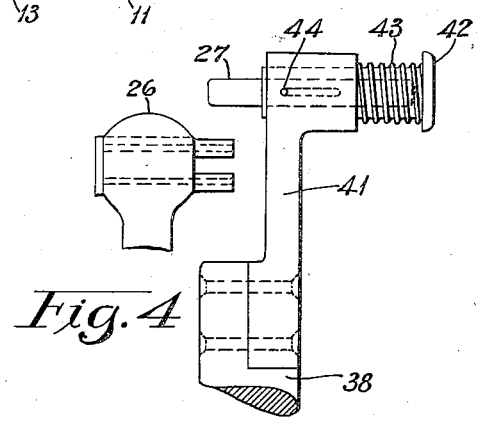
Figure 5:
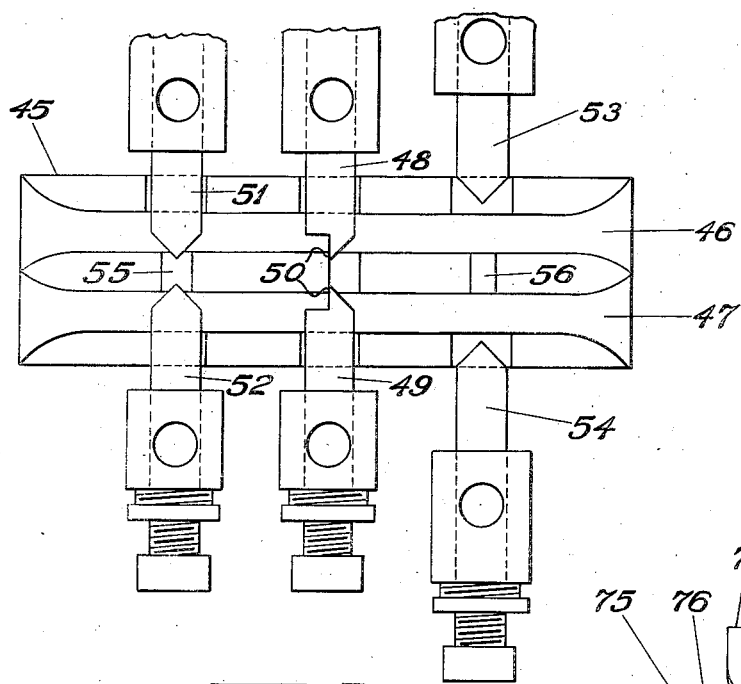
Figure 6:
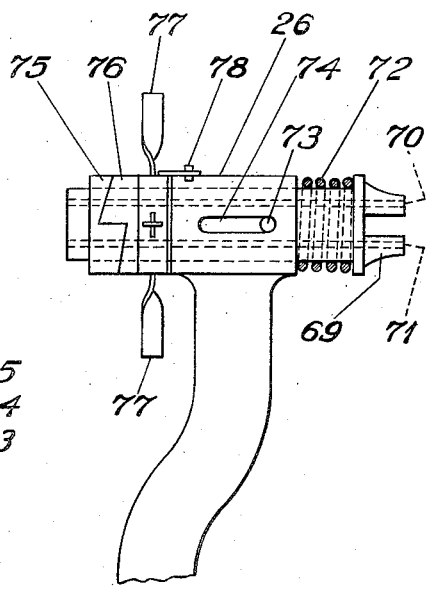
Figure 7:
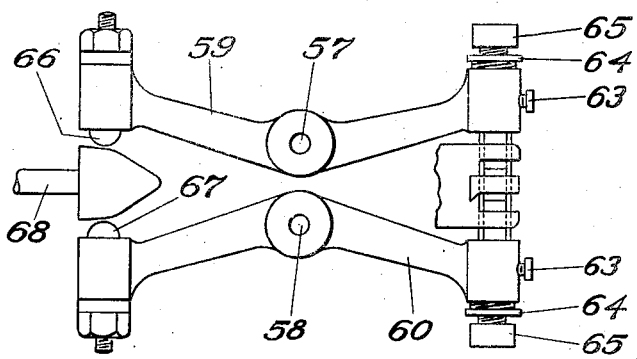
Figure 11:
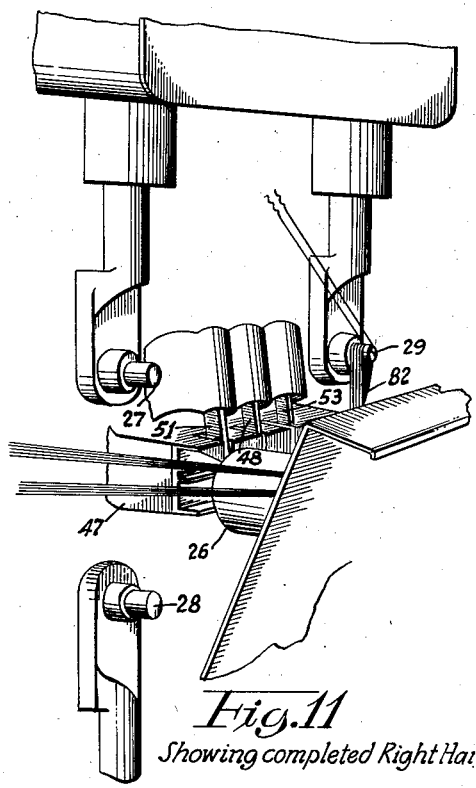
Figure 13:
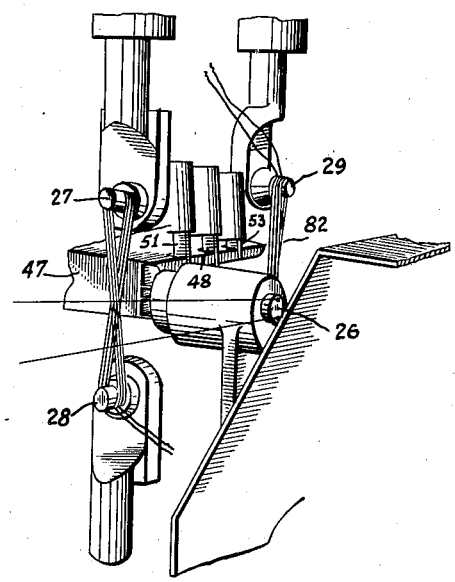
Figure 12:
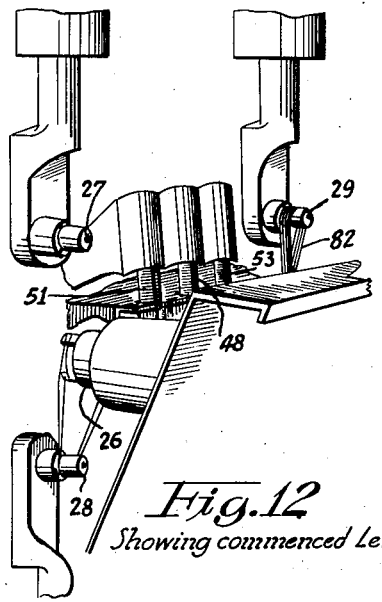
Figure 14:
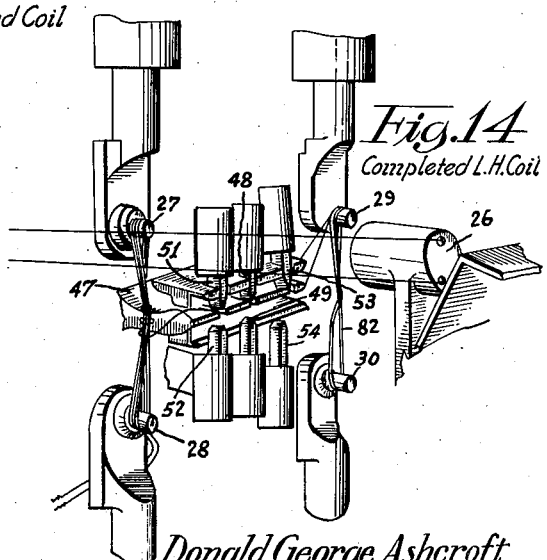

The drawings accompanying the specification illustrate a form of apparatus particularly suitable for carrying out the process of the present invention. Figure 1 represents a front elevation, and Figure 2 a plan showing the general arrangement of such a machine. Figure 3 shows a side view of one of the winding positions, and Figure 4 shows the construction and mounting of the winding pins. Figure 5 shows the operation of the cutting and stripping device suitable for use in conjunction with a shuttle having a double nozzle. Figure 6 shows a shuttle having a double nozzle and a device adapted to wind the wire spirally on the pins. Figure 7 shows the manner of operating the cutting and stripping punches illustrated in Figure 5. Figure 8 is a front view of my device. Figure 9 is a similar view. Figure 10 is a view of the coil produced on my device. Figure 11 is a front view at an angle, showing completed right-hand coil. Figure 12 is a front view at an angle, showing commenced left-hand coil. Figure 13 is a front view at an angle, showing rotation of left-hand coil on winding pins. Figure 14 is a front view at an angle, showing the completed left-hand coil. Figure 15 is a front view at an angle, showing the left-hand coil after stripping. Figure 16 is a front view at an angle, showing the completed right-hand coil.

It is obvious that the mechanical details of construction may be subjected to considerable modification without entailing any departure from the essential features of the invention.

The main driving shaft 1 is provided with a number of slidably-mounted dog clutches 2, 3, 4 and 5 rotating with it and capable of being independently engaged with or disengaged from gears adapted to drive the various component parts of the machine. Clutch levers actuated by cams on a gear train driven from the main shaft engage and disengage these clutches at appropriate points during the cycle of operations.

The gears engaged by the clutches are preferably interlocked in such a manner that overrunning is prevented, and the correct timing of the various operations is not disturbed.

The reciprocating motion of the shuttle between the two winding positions is obtained as follows. When the clutch 2 is moved into engagement with the spiral gear 6, which is permanently engaged with spiral gear 7 on crossshaft 8, the gear wheel 9 on shaft 8 rotates a crank wheel 10, which by means of a connecting rod 11 gives a reciprocating motion to the shuttle carriage 12, slidably mounted on shaft 13. The throw of the crank wheel 10 is predetermined in accordance with the lateral distance between the two winding positions.

The winding motion of the shuttle is obtained as follows. When the clutch 5 is engaged with the spiral gear 14, the drive is transmitted through the shafts 16 and 13 to the shaft 21 by means of the permanently engaged spiral gears 14 and 15, 17 and 18, and 19 and 20. The gear 19 is within the frame of the shuttle carriage 12 and reciprocates with it along the shaft 13, being adapted for sliding engagement with a keyway therein. The shaft 21 is mounted on bearings on the shuttle carriage and carries a slotted crank arm 22. The shuttle arm 24 is attached by a crank pin 23 to the slotted crank, and oscillates on a pivoted cross head 25 sliding in vertical guides on the upper part of the shuttle carriage. The projecting portion of the shuttle arm carries the shuttle head 26. The throw of the crank arm 22 is predetermined in accordance with the vertical separation of the winding pins. The form illustrated will produce simple overhand coils; but if desired figure-of-eight hanks may be coiled by giving suitable motions to parts 23 and 25 in known manner. In operation, the shuttle moves clockwise in an oval path enclosing winding pins 27 and 28 until a sufficient number of turns has been coiled on; whereupon clutch 5 is disengaged and clutch 2 engaged so that the shuttle carriage travels to the other winding position opposite winding pins 29 and 30. During this traversing movement the shuttle is arrested at a height midway between the two winding pins.

The wrapping of the coils in the left-hand winding position is obtained as follows. The clutch 4 engages with a bevel gear 31 which rotates freely on shaft 1 and by means of a bevel gear 32 (see Figure 3), transmits the drive to the shaft 33 and thence, by means of the permanently engaged gears 34 and 36, and 35 and 37, to the shafts 38 and 39 on which are mounted the winding pins 27 and 28. The winding pins are mounted in a slightly offset position so that the actual rotation of the coil for wrapping takes place around the common axis of the overhung shafts 38 and 39. Each winding pin is provided with a spring-loaded clearing device whereby the finished coil may be pushed off the pins by the action of a pressure plate 40 operated by a cam. The structure of the second winding unit carrying the pins 29 and 30 is identical with that of the first.

Figure 4 shows the detailed construction of one of the winding pins and its attachment to the shaft. A bracket 41 is attached to the shaft 38 and is bored to take a hollow sleeve 42 which is normally maintained in its rearmost position by means of a spring 43. The travel of the sleeves 42 is limited by a pin 44 which passes through a slot in sleeve 42 and locates the winding pin 27. The forward movement of the pressure plate 40 moves the sleeve 42 forward, compressing the spring 43, and forces the finished coil off the pin 27; whereupon the return movement of the pressure plate permits spring 43 to withdraw the sleeve and expose the winding pin.

Figure 5 shows the detail of a cutting and stripping device adapted for use with a double nozzle. The gate 45 is divided with two longitudinal slots 46 and 47 through which the twin nozzles pass, each carrying a length of wire from the last coil wound. Three pairs of punches operate in these slots. A pair of cutting punches 48 and 49 co-operate with cutting edges 50 situated midway between the two wrapping positions in the centre rib of the gate. The right and lefthand pairs of punches 51, 52, 53 and 54 are blunt-nosed stripping punches, and co-operate with recesses 55 and 56 in the centre rib of the gate. The punches 53 and 54 are shown in the open position, as they would normally be during the passage of the shuttle through the frame; the cutting punches 48 and 49 and stripping punches 51 and 52 are shown in the closed position, as for instance after a left-hand coil had been completed and the winding of a coil on the right-hand winding position had been commenced.

Figure 7 shows the method of operation of the cutting and stripping punches. Fixed shafts 57 and 58 carry rocking levers 59 and 60 accommodating punches at their forward ends secured by means of set screws 63. The punches are adjusted for length by collars 64 and adjusting screws 65. The rear ends of the rocking levers are provided with adjustable tappets 66 and 67 co-operating with a thrust cam 68. Forward movement of this thrust cam brings the punches attached to the rocking levers into co-operating contact with the respective slots or grooves in the gate of the cutting and stripping mechanism.

The latter mechanism is further provided with two strikers 79 and 80 (Figure 1) which move across the ends of the gate, striking down the severed ends of the wires and co-operating with the stripping punches to bare the ends of the wires for convenience in assembling the finished detonator. A third striker 81 (Figure 1) is also fitted for assistance in wrapping the coils, and operates in the following manner. At the conclusion of the winding step on the right-hand position, the shuttle stops in its rest position to the right of the pins, as in Figure 1. Striker 81 then descends until its end, bearing on the wires between the shuttle and the top pin, reaches a point nearly midway between the winding pins, when the wrapping movement starts, thereby wrapping the wires around the middle of the coil. The striker 79 also acts as a wrapping guide at the left-hand position, an extra lever being unnecessary here as the shuttle again stops at the right-hand side of the winding pins.

The timing of the movement of the various punches and strikers, and also of the engagement and disengagement of the clutches transmitting the drive to the various parts of the mechanism, is controlled by a gear train driven by a cross shaft 82 (Figure 2), which is driven through a spiral gear 83 from the main driving shaft 1.

Figure 6 shows an improved form of double-nozzle shuttle in which provision is made for moving the shuttle axially during winding so that a spiral coil is produced. The shuttle head 26 is bored to take the cylinder 69 carrying the two nozzles 70 and 71 and is retained in a forward position by spring 72. The nozzle is prevented from turning by a pin 73 engaging in a slot 74. The rear end of the nozzle is provided with a stepped cam ring 75 co-operating with a similar stepped cam ring on a star wheel 76. This star wheel is provided with a number of vanes 77 which are tripped by a stationary pin on the shuttle carriage at each revolution made by the shuttle around the winding pins. A spring device 78 serves to prevent over-running of the star wheel, which rotates an integral fraction of a revolution at every circuit of the shuttle and, by action of the stepped cam, moves the shuttle a step backward at every circuit round the winding pins. When the requisite number of turns has been laid on the winding pins, the last movement of the shuttle head past the carriage causes the cams to ride over the step and return to their original position as shown in readiness for the next winding operation.

Taking the commencement of the cycle of operations at the point where a fully coiled and wrapped hank is on the right-hand side, and the shuttle has moved to the left and occupied the position shown in Figure 1, carrying the wire leads through the gate, the cycle runs as follows.

The clutch 2 is disengaged and the clutch 5 engaged, starting the coiling in a clockwise direction around pins 27, 28. When a few turns have been wound on the pins, the cutting and right-hand stripping punches close, severing the wires and gripping the ends from the right-hand coil between the stripping punches and their co-operating slots.

Striker 80 descends and drags these ends through this grip, stripping their insulation for a distance corresponding to the separation of the cutting and stripping punches. Striker 79 also descends and knocks out of the gate the free ends of the wires now anchored around the pins 27, 28, and immediately rises again. When the hank is fully coiled, the clutch 5 disengages and the shuttle stops at the rest position opposite the middle of the hank. Striker 79 descends again to assist the wrapping action, and the clutch 4 engages the bevel gear 31, starting the wrapping action. During the wrapping of the left-hand hank, the right-hand pressure plate operates, pushing the finished hank off the pins 29, 30.

When wrapping is complete, the clutch 4 disengages and clutch 2 engages, and the shuttle carriage moves across to the right-hand position, carrying the wires through the gate. Clutch 2 then disengages, clutch 5 engages, and coiling commences round pins 29, 30 in a clockwise direction.

As the coiling commences, the cutting and left-hand stripping punches descend, severing the wires and gripping the tail of the left-hand wound and wrapped coil. The inside strikers 79 and 80 now descend, knocking down the loose end of the coil being wound at the right-hand position and stripping the tail of the completed left-hand coil. When coiling is complete, the clutch 5 disengages, leaving the shuttle at the rest position, striker 81 descends to position the wires for wrapping and clutch 3 engages, operating the right-hand wrapping rotation. The completed hank on the left-hand side is now pushed off the pins. When the wrapping is completed, clutch 2 engages, clutch 3 disengages and the carriage moves to the left-hand side and recommences the cycle.

This cycle may be described more generally as follows by referring to Figures 11 through 16. In Figure 11 there is depicted a completed coil on the right-hand or distant winding pins, and the twin-wire shuttle is emerging from the gate before starting to wind on the left-hand pins.

Figure 12 shows a slightly later stage than Figure 11, the winding having commenced on the left-hand or nearer pins. In Figure 13 the coil on the left-hand or nearer pins is being wrapped by rotation of the winding pins while the shuttle is arrested opposite the middle of the coil. The feed wire is being supplied to the back of the shuttle. In Figure 14 the left-hand coil has been completed and the shuttle has returned through the gate and has made several complete turns around the right-hand pins. The left-hand stripping punches and the central cutting punches are in operation, and the left-hand striker is shown in contact with the tail of the left-hand coil. In Figure 15 the upward movement of the left-hand striker has stripped and knocked up the tail of the left-hand coil. The stripped ends of the wire may be seen in front of the casing of the left-hand stripping punch. The corresponding head end of the right-hand coil, which has been knocked out of the gate by the right-hand striker, is not stripped. The right-hand coil is being wrapped around the middle, and the left-hand pressure plate is on the point of pushing the left-hand coil off the pins. In Figure 16 the right-hand coil is completed and the shuttle is about to move to the left through the gate. The left-hand coil had just been pushed off the pins. The original portion of the cycle shown in Figure 11 commences again very shortly after this stage.

Although the foregoing represents the completed cycle, it may be helpful to describe in slightly greater detail a certain portion of the cycle. Referring for this purpose to Figure 8, we see a front view of the device, showing that period in the operation in which the coil on the left-hand position is fully wound and the shuttle has passed through the gate and is on the point of completing the first figure-of-eight around the pins at the right-hand position. Of the three pairs of punches, the left-hand pair has already gripped the wires in the gate and the next step will be the actuation of the center pair of punches in order to cut the wire. Then, the strikers knock down the free end of the right-hand coil and thereby strip the insulation from the tail on the left-hand coil where it is held by the left pair of punches. Figure 9 is a similar view to that of Figure 8, but shows the position when the tail of the right-hand coil has been stripped and the finished coil is being pushed off the pins. The wires are being wound around the middle of the left-hand coil and the punches are opening to permit the passage of the shuttle through the gate.

The supply of wire may be of the type usually employed for blasting detonator leads; that is, of copper or tinned-iron wire provided with an insulating waterproof coating such as waxed cotton or a suitable synthetic resin. The wire should be flexible and sufficiently malleable to be moulded around winding pins by the tension at which it is being coiled, so that the frictional resistance of a few turns of the wire around the pins will serve as an anchorage and prevent the partly-wound coils from slipping under the winding tension. The friction of the wire leads on the shuttle and guides will usually provide sufficient winding tension.

The apparatus illustrated and described above is of course only my preferred form. I could if I wished use the stripping tools as clamps to hold the wire in which case I could make the cut in the wire before starting the winding of the second coil. By using such a device I could eliminate the second pair of winding pins, the cycle of operations in this case being first coiling, then passing through the cutter and stripper, then clamping the wire by means of the stripper, cutting it, throwing it off the winding pins and bringing the shuttle back to the winding pins to commence the second coil.

As many apparently widely different embodiments of this invention may be made without departing from the spirit and scope thereof it is to be understood that I do not limit myself to the specific embodiments thereof except as defined in the appended claims.

I claim:

1. A process of manufacturing a succession of substantially identical coiled and wrapped hanks of wire which comprises forming a continuous length of the wire into hanks at two different operating positions in sequence, causing the wire to travel from the one operating position to the other between successive forming operations, and between the completion of the forming operation at each position and the completion of the operation at the next position, severing the wire at some point on its path to the latter position and removing the finished coil from the former position, each forming operation comprising the steps of coiling a quantity of the wire by the relative movement of a shuttle and a pair of winding pins and rotating the coil so formed round its longitudinal axis so that it is wrapped under tension.

2. A process as claimed in claim 1 in which the wire is not severed until a sufficient quantity of wire is coiled in the latter position to prevent the wire from slipping during coiling.

3. A process as claimed in claim 1 in which insulation is stripped from at least one end of the wire in conjunction with the severing operation.

4. A process of manufacturing a succession of coiled and wrapped hanks of wire from a continuous supply thereof which comprises coiling a quantity of the wire into a hank by the relative movement of a shuttle with respect to a pair of winding pins, rotating the coiled hank so formed about its longitudinal axis so that the coils are wrapped by the wire under tension, causing a part of the wire between the shuttle and the hank to be held while the shuttle passes to a pair of winding pins and coils a sufficient length of wire thereon to prevent the wire from slipping during coiling, provision being made whereby the wire is severed between the completed hank and the holding means, and the completed hank removed from the winding pins between the time when the wire is held and the time when the pins are required for the coiling of a subsequent hank.

5. Apparatus for manufacturing a succession of coiled and wrapped hanks of wire comprising a shuttle, means for causing relative movement between the shuttle and each of two pairs of winding pins in order to form coils of wire successively on each of the said pairs of winding pins, the means for causing rotation of the winding pins about the longitudinal axis of the coil formed thereon and a severing mechanism located on the path of the shuttle from one pair of winding pins to the other.

6. Apparatus as claimed in claim 5 in which the severing mechanism is also adapted for the purpose of stripping insulation from the ends of the wire.

7. Apparatus as claimed in claim 5 in which the shuttle is adapted to feed two wires.

8. Apparatus as claimed in claim 5 in which the severing mechanism comprises at least one channel adapted to hold the wire which is fed from the shuttle, knives being arranged to move across the channel when required.

9. Apparatus for manufacturing a succession of coiled and wrapped hanks of wire from a continuous supply thereof which comprises at least one pair of winding pins and a shuttle capable of relative movement with the said pins in order to form a coil of wire on said winding pins, the said winding pins being adapted to rotate round the longitudinal axis of the coil formed thereon, a holding mechanism adapted to grip the wire and means whereby the shuttle can be induced to carry the wire into said holding means, means for severing the wire between the coil and the said holding means and means for removing completed coil from the said winding pins.

10. Apparatus for manufacturing a succession of coiled and wrapped hanks of wire from a continuous supply thereof which comprises two pairs of winding pins located respectively at each of two independent winding positions, a shuttle capable of relative movement with each pair of said pins in order to form a coil of wire at each of said winding positions, said shuttle being also adapted to move from one winding position to another, a gate disposed between said winding positions adapted to permit the passage of the shuttle carrying wire therethrough from one winding position to the other, and combined cutting and stripping means disposed at said gate including at least one cutting punch along with at least one cutting edge and at least one blunt nosed stripping punch along with and co-operating with at least one stripping recess.

11. Apparatus for manufacturing a succession of coiled and wrapped hanks of wire from a continuous supply thereof which comprises two pairs of winding pins located respectively at each of two independent winding positions, a shuttle capable of relative movement with each pair of said pins in order to form a coil of wire at each of said winding positions, said shuttle being provided with a double nozzle and being also adapted to move from one of said winding positions to another, a gate disposed between said independent winding positions including two longitudinal slots adapted to permit the passage therethrough of said twin nozzles of the shuttle each carrying a length of wire from the last coil wound, three pairs of punches operating in said slots including a pair of cutting punches and a right and left-hand pair of blunt nosed stripping punches, cutting edges disposed midway of the center rib of said gate and co-operating with each of said pair of cutting punches, and right and left-hand pairs of stripping recesses disposed in the center rib of said gate co-operating respectively with each of said right and left-hand pairs of stripping punches.

DONALD GEORGE ASHCROFT.